Feb. 26, 1952     K. I. POSTEL     2,586,991

SWIVEL PIPE JOINT

Filed Dec. 14, 1946

INVENTOR.
KENNETH I. POSTEL

BY *Ralph L. Tweedale*

ATTORNEY.

Patented Feb. 26, 1952

2,586,991

UNITED STATES PATENT OFFICE 2,586,991

SWIVEL PIPE JOINT

Kenneth I. Postel, Detroit, Mich., assignor to Vickers Incorporated, Detroit, Mich., a corporation of Michigan Application December 14, 1946, Serial No. 716,312

11 Claims. (Cl. 285—96.1)

This invention relates to power transmissions, particularly to those of the type comprising two or more fluid pressure energy translating devices, one of which may function as a pump and another as a fluid motor.

The invention relates generally to variable displacement hydraulic motor-pump devices of the type employing a swinging yoke supporting a cylinder barrel in which multiple pistons of the axially reciprocable type are employed. More specifically the invention relates to rotatable hydraulic couplings such as the hollow pintle construction on which a motor-pump yoke is pivoted to the housing.

One of the difficulties with the hollow pintle structure is to maintain a satisfactory peripheral seal against the pintle. Various flexible annular sealing elements have been employed such as leather, mounted in an annular groove and held in sealing contact with the periphery of the pintle. At the higher pressures used in present day practice, a slight increase in clearance between the pintle and housing might permit the seal to blow out and require repacking the joint.

In earlier construction, when the pintle was journalled in the yoke, the critical sealing area of the pintle was around its periphery. Under the present invention the relative rotation is at the end face of the pintle, the pintle being adapted to rotate in unison with the yoke. The present sealing element is in the form of an annular metal bushing adapted to bear axially against the end face of the yoke, pintle or pressure fluid conductor. The sealing element is substantially pressure balanced and adapted to move axially into end abutment with the pintle or conductor and maintain a uniform sealing contact therewith regardless of pressure variations.

Therefore, one of the objects of this invention is to provide a pressure balanced annular sealing element adapted to move axially into sealing engagement with the mating surface on the end face of the conductor to be sealed.

The problem of sealing rotating peripheral surfaces has always been a difficult one but when the relative movement is axial, the mating surfaces can be readily sealed with a torus type of seal. In the present swing joint structure there are no rotating peripheral surfaces to be sealed since the major relative movement is between the end faces of the conductor and sealing element.

Therefore, another object of the invention is to provide a hydraulic rotating coupling in which the rotating element is sealed on its abutting end face and is free of relative peripheral rotation requiring pressure seals.

Another object is to provide pressure responsive means for urging the sealing element axially into sealing contact with the conductor to be sealed.

Still another object is to provide resilient means for urging the sealing element into sealing contact with the conductor independent of operating pressure.

The present invention is particularly applicable to the variable displacement motors and pumps of the type employing swinging yokes pivoted on hollow pintles. By fastening the yoke to a pair of pintles and journalling the pintles in the frame, an annular sealing element can be mounted in the frame in sealing abutment with the end of the pintle.

Therefore, another object of the present invention is to provide a novel, economical pintle construction for a variable displacement motor-pump, employing the swinging yoke design.

Further objects and advantages of the present invention will be apparent from the following description, reference being had to the accompanying drawing wherein a preferred form of the present invention is clearly shown.

Figure 1:
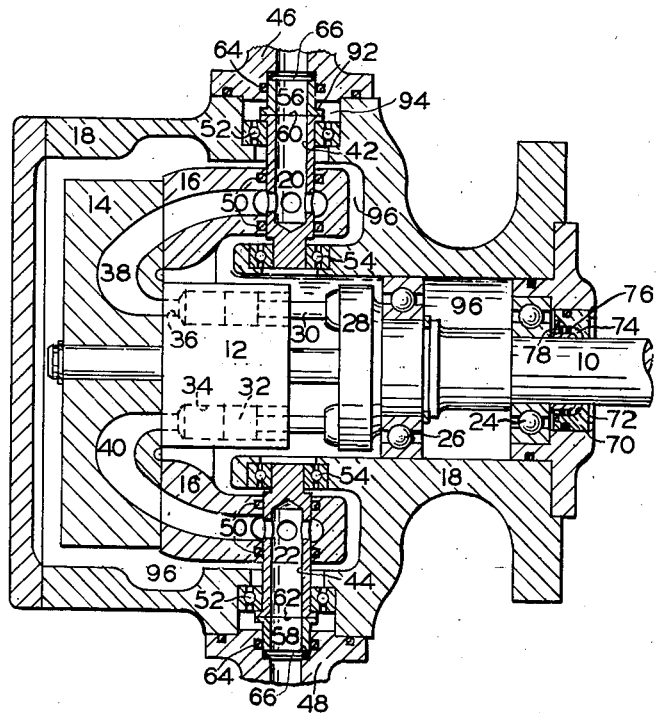
Figure 1 is a sectional view of a hydraulic motor-pump device employing a preferred form of the invention.

In detail, the motor-pump device disclosed in Figure 1 includes a shaft 10 connected to a cylinder barrel 12 which rides on a valve plate 14 mounted in the yoke 16 which is pivoted to frame 18 by means of pintles 20 and 22.

The shaft 10 is journalled in bearings 24 and 26 and is provided with a flanged portion 28 which is connected by piston rods 30 to pistons 32 reciprocably mounted in cylinders 34. Cylinders 34 are connected by ports 36 to passages 38 and 40 which in turn communicate with the central bores 42 and 44 of the hollow pintles 20 and 22 and the external connections or frame flanges 46 and 48, respectively.

The yoke 16 is fastened to pintles 20 and 22 and secured against relative rotation by means of torus seals 50. The pintles 20 and 22 are journalled in bearings 52 and 54 and free to rotate in the frame 18.

Annular metal sealing elements 56 and 58 are mounted in the flanges 46 and 48, respectively, of stationary frame 18, and are adapted to move axially into sealing contact with the end faces 60 and 62 of pintles 20 and 22, respectively. Torus seals 64 are employed on the peripheral surface of the sealing elements 56 and 58. A wave washer or resilient element 66 (Figure 2) is provided to urge the element 56 into sealing contact with pintle 20.

A shaft seal 70 is provided and comprises a guide chamber 72 in which a generally cylindrical sealing element 74 is located and adapted to be moved radially into sealing contact with shaft 10. A resilient element or spring 76 is positioned in the guide chamber 72 in back of the sealing element 74 for extruding the element radially from the chamber 72 into sealing contact with shaft 10. A passage 78 conducts pressure fluid to the chamber 72 in back of the element 74 whereby any increase in pressure will directly aid the spring 76 and provide a greater sealing force in proportion to the increase in pressure.

Figure 2:
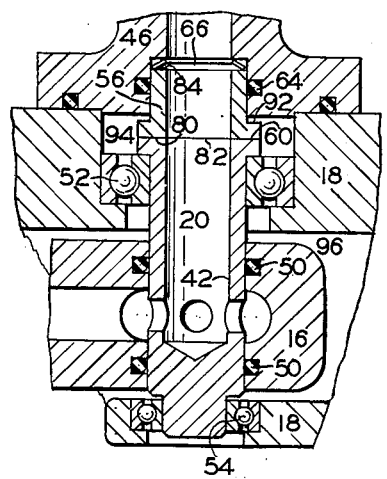
Figure 2 is an enlarged sectional view of the novel pintle construction shown in Figure 1.

In Figure 2, it will be observed that the sealing element 56 is adapted to shift axially whereby its annular face 80 may be moved to a point adjacent face 60 of pintle 20 and maintain sealing contact therewith. The internal edge of the sealing joint formed by the intersection of the mating surfaces 60 and 80 and bore 42 is in direct communication with the continuous passage formed by the pintle 20 and element 56. Since it is impossible to exclude pressure fluid from such a joint or abutment of surfaces, an annular film 82 of pressure fluid is maintained between the adjacent surfaces supplied from the passage or bore 42. The external edge or periphery of annular film 82 is connected to atmosphere or a relatively lower pressure than maintained in bore 42. Any fluid escaping from the film 82 or periphery of the adjacent surfaces 60 and 80 will be conducted through the cage of bearing 52 to the inner case 96 and thence to the drain.

Figure 3:
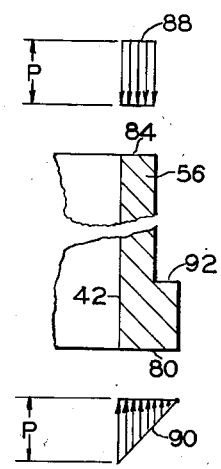
Figure 3 is a diagrammatic illustration of the theoretical pressure balance of the sealing element.

In Figure 3, the relative pressure forces on the sealing element 56 are illustrated diagrammatically. The pressure "P" represents a unit of pressure in the passage or bore 42 which is exerted at the point of intersection of the annular surfaces 60 and 80 with the bore 42, while the pressure at the periphery of said annular surfaces 60 and 80 is zero.

The mean effective unit pressure on the entire annular surface 80 is approximate one-half the maximum pressure. Therefore, in order to balance the pressure on the element 56, the annular area 84 was made approximately one-half the area 80. Actually the area of 84 is slightly greater than one-half the area of 80 and consequently the sealing element 56 is actually unbalanced and adapted to be urged toward the mating surface 60 of the pintle 20, in response to pressure. The opposed pressure forces against element 56 are illustrated by the groups of arrows 88 and 90 and theoretically are substantially balanced. The annular step 92 is located in chamber 94 which in turn is hydraulically connected to the case 96 through the cage of bearing 52 and consequently is subject to tank pressure and does not affect the pressure balance of sealing element 56.

In operation, with the motor-pump device of Figure 1 being operated as a pump, the rotating group would be driven by shaft 10 connected to a prime mover (not shown). Hydraulic fluid would be drawn in through bore 44 of pintle 22 and directed to cylinder 34 through passage 40. After compression in the cylinder barrel 12, the pressure fluid is discharged through passage 38, pintle 20, sealing element 56 and external connecting flange 46.

The length of stroke and displacement of the pump is varied by swinging the yoke 16 to either side of its center position. The yoke 16 is pivoted to the frame by means of pintles 20 and 22. The pintles are pressed into the torus seals 50 and rotate with the yoke 16 in bearings 52 and 54 of frame 18.

The sealing element 56 is non-rotatively fastened to the frame 18 by torus seals 64 but relatively free to move axially in the bore of external connection 46 and be urged into sealing engagement with the end face 60 of pintle 20, (Figure 2). Therefore, during rotation of the yoke the pintle surface 60 rotates in relation to the sealing element surface 80, and is maintained in sealing contact therewith by means of operating pressure. No matter how tightly the abutting surfaces 60 and 80 are pressed together, internal pressure fluid will enter the minute separation and establish a film 82 extending to the external edge of the mating surfaces.

The pressure drop from the internal to the external edge of the film will normally be equal to the value of the pressure in the bore. In other words, the film pressure drops gradually toward the external limit and the average pressure in the film 82 between the mating surfaces 60 and 80 is one-half the maximum pressure at the internal edge of the film. Therefore, the total force tending to separate the mating surfaces can be calculated by multiplying the area of one of the adjacent mating surfaces by one-half the value of the maximum pressure.

To counter-act the pressure forces of film 82 tending to break the seal by separating the sealing element 56 from the pintle 20, a counterbalancing annular pressure area 84 is provided on sealing element 56 responsive to fluid pressure from the internal bore of the passage. Since area 84 is subject to maximum pressure over its entire surface as compared with an average of one-half that pressure on area 80, it is evident that an exact balance of forces capable of preventing axial movement of the element 56, would prevail only if area 84 is one-half area 80.

However, it is desirable that element 56 be maintained in sealing contact with pintle 20 regardless of variations in pressure and therefore the area 84 is made slightly larger than half the area of 80. During starting operation of the pump before any pressure has been developed, the resilient element or wave washer 66 is provided which constantly urges the sealing element 56 into sealing contact with pintle 20.

It will thus be seen that the present invention has provided a hydraulic swing joint or pintle construction having excellent sealing characteristics and suitable for high pressure operation without unduly loading or binding the pintle and yoke. This is accomplished by means of an annular sealing element adapted to shift axially into sealing contact with the end face of the pintle or rotating conductor and maintain a uniform seal regardless of variations in operating pressure fluid.

While the form of embodiment of the invention as herein disclosed constitutes a preferred form, it is to be understood that other forms might be adopted, all coming within the scope of the claims which follow.

What is claimed is as follows:

1. In a rotatable pressure fluid coupling, a rotatable conductor, a relatively non-rotatable annular sealing element abutting the end face of the conductor to form a continuous fluid passage, sealing surfaces on the adjacent faces of the conductor and element separated by a film of pressure fluid supplied from the passage, and means on the element forming two end areas opposite the sealing surface only one of which is exposed to pressure from the passage, said one area being proportioned to counterbalance the pressure force in the film tending to separate the adjacent sealing surfaces and maintain said surfaces in substantial sealing contact.

2. In a rotatable pressure fluid coupling, a rotatable conductor, a relatively non-rotatable annular sealing element abutting the end face of the conductor to form a continuous fluid passage, sealing surfaces on the adjacent faces of the conductor and element separated by a film of pressure fluid supplied from the passage, and means on the element forming two separate end areas opposite the sealing surface only one of which is exposed to pressure within the passage, the end area exposed to pressure within the passage being proportioned to counterbalance the pressure force in the film tending to separate the adjacent sealing surfaces and maintain said surfaces in substantial sealing contact, and having a projected area approximately one-half the projected area of the sealing surface of the element.

3. In a rotatable pressure fluid coupling, a rotatable conductor, a relatively non-rotatable annular sealing element abutting the end face of the conductor to form a continuous fluid passage, sealing surfaces on the adjacent faces of the conductor and element separated by a film of pressure fluid supplied from the passage, and means on the element forming two separate end areas opposite the sealing surface only one of which is exposed to pressure from the passage said end area exposed to pressure in the passage being proportioned to counterbalance the pressure force in the film tending to separate the adjacent sealing surfaces and maintain said surfaces in substantial sealing contact, and resilient means for maintaining the adjacent surfaces in sealing contact independent of fluid pressure.

4. A hydraulic coupling comprising a pair of conductors, one rotatable and the other relatively stationary, an annular sealing element mounted substantially non-rotatably in the stationary conductor but adapted to move axially toward or away from the end face of the rotatable conductor, said conductors and annular sealing element forming a continuous hydraulic passage, sealing surfaces on the adjacent end faces of the rotatable conductor and element separated by a thin film of pressure fluid supplied from the passage, and means on the element forming two separate and approximately equal end areas opposite the sealing surface, only one of which is exposed to pressure within the passage, the end area exposed to pressure in the passage being proportioned to exert only a slight resultant force on the element and maintain the adjacent surfaces of the element and conductor in uniform sealing contact regardless of pressure variations in the passage.

5. A hydraulic coupling comprising a pair of conductors, one rotatable and the other relatively stationary, an annular sealing element mounted substantially non-rotatably in the stationary conductor but adapted to move axially toward or away from the end face of the rotatable conductor, said conductors and annular sealing element forming a continuous hydraulic passage, sealing surfaces on the adjacent end faces of the rotatable conductor and element separated by a thin film of pressure fluid supplied from the passage, and which is in communication externally with a relatively lower pressure area, and differential pressure areas on the element in communication with the pressure fluid in the passage, said pressure areas being proportioned to exert a slight net resultant force on the element and maintain the surfaces of the element and conductor in uniform sealing contact regardless of pressure variations in the passage, one of the differential pressure areas being the face of the sealing element adjacent the rotatable conductor and subject to the average fluid pressure of the film, the other having a projected area approximately one-half the projected first area and directly exposed to the passage pressure.

6. A hydraulic coupling comprising a pair of conductors, one rotatable and the other relatively stationary, an annular sealing element mounted substantially non-rotatably in the stationary conductor but adapted to move axially toward or away from the end face of the rotatable conductor, said conductors and annular sealing element forming a continuous hydraulic passage, sealing surfaces on the adjacent end faces of the rotatable conductor and element separated by a thin film of pressure fluid supplied from the passage, and differential pressure areas on the element in communication with the pressure fluid in the passage, said pressure areas being adapted to exert a slight net resultant force on the element and maintain the adjacent surfaces of the element and conductor in uniform sealing contact regardless of pressure variations in the passage, and resilient means for maintaining the adjacent surfaces in sealing contact independent of fluid pressure.

7. In a rotatable hydraulic pressure fluid coupling, a rotatable conductor and a relatively non-rotatable annular sealing element with their end faces in substantial sealing abutment and forming a continuous hydraulic conductor, said sealing element being adapted to be moved axially in response to fluid pressure to provide a pressure controlled restricted annular passage between the end faces and adapted to conduct pressure fluid from the internal bore of the conductor to a point external of the passage maintained at relatively lower pressure, and means comprising a pressure effective surface associated with the element responsive to fluid pressures in the conductor adapted to urge the sealing element toward the rotatable conductor, the pressure effective area of the surface being proportioned to slightly overbalance the pressure force in the film tending to separate the sealing element from the conductor.

8. In a rotatable hydraulic pressure fluid coupling, a rotatable conductor and a relatively non-rotatable annular sealing element with their end faces in substantial sealing abutment and forming a continuous hydraulic conductor, said sealing element being adapted to be moved axially in response to fluid pressure to provide a pressure controlled restricted annular passage between the end faces and adapted to conduct pressure fluid from the internal bore of the conductor to a point external of the passage maintained at relatively lower pressure, and a separate pressure surface on the element responsive to fluid pressures in the conductor and having an effective pressure area adapted to urge the sealing element toward the rotatable conductor and proportioned to slightly overbalance the pressure force in the film tending to separate the sealing element from the conductor, and resilient means for maintaining the adjacent surfaces in sealing contact independent of fluid pressure.

9. In a hydraulic coupling, stationary and rotatable fluid conductors connected by an annular sealing element to form a continuous hydraulic passage, said element being non-rotatively fixed to one conductor but free to move axially therein, an annular sealing surface on the end face of the other conductor adjacent a mating surface on the element, a film of fluid maintained between the adjacent mating surfaces, said film being in communication internally with the pressure fluid in the passage and externally with a relatively lower pressure effective surface, and a pressure area on the opposite end of the element subject to the internal pressure of the passage and the pressure effective area of the surface being proportioned to slightly overbalance the pressure force against the mating surface of the element thereby maintaining the element in axial sealing contact with the conductor.

10. In a hydraulic coupling, stationary and rotatable fluid conductors connected by an annular sealing element to form a continuous hydraulic passage, said element being non-rotatively fixed to one conductor but free to move axially therein, an annular sealing surface on the end face of the other conductor adjacent a mating surface on the element, a film of fluid maintained between the adjacent mating surfaces, said film being in communication internally with the pressure fluid in the passage and externally with a relatively lower pressure area, and means on the element forming two separate end surfaces only one of which is exposed to pressure in the passage, the surface exposed to pressure having a projected pressure area slightly greater than half the projected area of the mating surface on the element and proportioned to counterbalance the pressure force against the mating surface of the element thereby maintaining the element in axial sealing contact with the conductor.

11. In a hydraulic coupling, stationary and rotatable fluid conductors connected by an annular sealing element to form a continuous hydraulic passage, said element being non-rotatively fixed to one conductor but free to move axially therein, an annular sealing surface on the end face of the other conductor adjacent a mating surface on the element, a film of fluid maintained between the adjacent mating surfaces, said film being in communication internally with the pressure fluid in the passage and externally with a relatively lower pressure area, means on the element forming two separate end surfaces only one of which is subject to the internal pressure of the passage said surface exposed to pressure being proportioned to counterbalance the pressure force against the mating surface of the element thereby maintaining the element in axial sealing contact with the conductor, and resilient means for maintaining the element in sealing contact with the conductor independent of fluid pressure.

KENNETH I. POSTEL.

REFERENCES CITED

The following references are of record in the file of this patent:

UNITED STATES PATENTS

| Number | Name | Date |
| --- | --- | --- |
| 939,908 | Greenlaw | Nov. 9, 1909 |
| 2,062,186 | Mittelman | Nov. 24, 1936 |
| 2,284,110 | Vickers | May 26, 1942 |

FOREIGN PATENTS

| Number | Country | Date |
| --- | --- | --- |
| 617,813 | France | of 1926 |